Patented July 18, 1950

2,515,244

UNITED STATES PATENT OFFICE 2,515,244

PRODUCTION OF GUANIDINE SULFATES

Johnstone S. Mackay, Old Greenwich, Conn., assignor to American Cyanamid Company, New York, N. Y., a corporation of Maine No Drawing. Application December 24, 1946,
Serial No. 718,273

4 Claims. (Cl. 260—564)

The present invention relates to the production of guanidine values and more particularly to a new method whereby such values are provided as guanidine sulfates.

An object of the present invention is to provide guanidine values and more specifically guanidine sulfates at low cost by a new process employing cheap reactants and simple apparatus and procedures.

Another object of the present invention is to provide such guanidine values by a new method adaptable to being carried out continuously and in which substantially complete utilization of the reactants is obtained.

Other objects will be apparent from the discussion that follows hereinafter.

It has now been found that $NH_3$, $CO_2$ and $SO_3$ may be reacted to produce guanidine sulfate. The reaction occurs readily at moderately elevated temperatures provided that the gaseous reactants are employed in substantially the proper proportions. While it is preferred to carry out the reaction employing the three gases directly, the process of the invention is also effected when employing materials which at the temperatures of reaction decompose or break down to provide such gaseous reactants. Materials which will provide $NH_3$ and $CO_2$ are, for example, ammonium carbamate and the like, whereas, materials capable of providing $SO_3$ are sodium chlorsulfonate and materials which will supply $SO_3$ and $NH_3$ are sulfamic acid, ammonium sulfamate and the like. However, such materials are not as adaptable to carrying out the process continuously as are the gases.

While the reaction may be carried out over a wide range of temperatures, it is preferred to employ a temperature within the range of substantially 250°–400° C., and still more preferable to employ one within the range of substantially 275°–350° C. At temperatures substantially below 250° C. the reaction proceeds somewhat slowly, whereas at those substantially above 400° C. decomposition resulting in the formation of melamine and other undesired by-products begins to become appreciable.

While widely varying ratios of the gaseous reactants may be employed in carrying out the reaction of the present invention, experiments have shown that best results are obtained employing such reactants in a ratio of substantially 1 mol of $CO_2$:1–2 mols of $SO_3$:2–6 mols of $NH_3$. The use of a ratio substantially different from that aforementioned will result in the production of the desired guanidine sulfates although the yield of such sulfates may be somewhat lower. The use of a higher ratio of $NH_3$, particularly with respect to the $SO_3$, results in a larger proportion of the sulfate being in the form of the diguanidine sulfate, whereas the use of a lower ratio of $NH_3$ results in obtaining an increased proportion of the monoguanidine sulfate. As indicated hereinabove, the object of the invention is to prepare the guanidine molecule, i. e., guanidine values, so that it is seldom of any material importance as to which guanidine sulfate is predominant in the reaction mixture. Further, either sulfate is readily obtainable from the other by the simple expedient of making a suitable adjustment in pH of an aqueous solution of the guanidine sulfate, the monoguanidine sulfate obtaining at a pH of about 2 whereas the diguanidine sulfate is isolated from a solution having a pH of about 7.

The reaction may be carried out employing a wide range of pressures, although practical considerations dictate the use of the highest pressures which may be employed with the equipment available. The use of such higher pressures results in obtaining higher yields because of mass action considerations and, of course, increases the capacity of any given piece of equipment. It is preferred to carry out the reaction with the total pressure of the reactants being of the order of at least 300 lbs./sq. in., said reactants being employed in substantially the ratios aforementioned.

Experiments have shown the rate of reaction of the present invention to be favorably high, and this together with the fact that the reactants are all gases renders the process readily adaptable to continuous operation. The ability to recirculate the unreacted gases after separating out the product of the reaction insures a practically complete utilization of the starting materials. In such a continuous operation the gases are pumped under pressure through a reactor maintained at the desired temperature, and preferably in the form of a tube or tube bundle of suitable length, and thereafter through a suitable cooling zone which may likewise be a tube or tube bundle to solidify the fused or semi-fused product. The unreacted gases are then put through suitable solids collecting apparatus, such as a conventional cone, to separate the solid product from the unreacted gases. Such gases are then recycled through the reactor, additional amounts of the reactants being supplied as required to maintain the pressure and ratio of such at the desired level. Scrapers may be employed in the cooling zone to remove solidified product from the walls and direct the same to a suitable outlet equipped, for example, with a pair of gate valves through which the material may be removed from the apparatus.

The following examples are given to provide a more detailed description of the manner in which the process of the present invention may be employed to provide the guanidine sulfates:

Example 1

An autoclave of 300 cc. capacity was charged with 22 g. of $CO_2$ (as "dry ice"), 51 g. of liquid ammonia and 80 g. of liquid $SO_3$. The autoclave was quickly sealed and thereafter heated to 350° C. for ½ hour. After this short period of reaction the autoclave was cooled, the gases were vented and the solid reaction product was washed from the autoclave with water. The aqueous solution contained 13.4 g. of guanidine sulfate predominantly in the form of the diguanidine sulfate.

Example 2

An autoclave of 300 cc. capacity was charged with 22 g. of $CO_2$, 80 g. of $SO_3$ and 43 g. of $NH_3$. The autoclave was quickly sealed and thereafter heated to 325° C. for ½ hour. Thereafter, the autoclave was cooled, the gases were vented and the solid reaction product was washed from the autoclave with water. The aqueous solution contained 9.8 g. of guanidine sulfate which was mainly the diguanidine sulfate.

Example 3

An autoclave of 300 cc. capacity was charged with 39 g. of ammonium carbamate and 97 g. of sulfamic acid. The autoclave was thereafter sealed and heated to 300° C. for 2 hours. Thereafter, the autoclave was cooled, gases were vented and the solid reaction product was washed from the autoclave with water. Guanidine sulfate solution was treated with an excess of picric acid to precipitate the guanidine values as the guanidine picrate which was recovered by filtration. The equivalent amount of guanidine thus obtained was 7.4 g.

Example 4

An autoclave of 300 cc. capacity was charged with 39 g. of ammonium carbamate and 58 g. of ammonium sulfamate. The autoclave was thereafter sealed and heated to 250° C. for 2 hours. The autoclave was then cooled and vented to release the pressure. The solid reaction product was scraped from the autoclave, dissolved in about 100 cc. of ethanol and treated with an excess of alcoholic KOH to effect precipitation of $K_2SO_4$ and provide a solution of the free base containing about 4.5 g. of said guanidine.

Example 5

29.3 g. of carbon dioxide, 22.1 g. of ammonia and 78.6 g. of sodium chlorosulfonate were charged to a 300 cc. autoclave which was thereafter sealed and heated at 250° C. for 2 hours. After this period the autoclave was cooled, the gases were vented and the solid reaction product was washed from the autoclave with water. This aqueous solution contained an amount of guanidine sulfate equivalent to 5 g. of the free base.

The isolation of the guanidine sulfate may be effected by any of the conventional means such as cooling or evaporating to cause crystallization or by adding ethanol or other water-miscible organic liquid to decrease the solubility of the salt and cause its precipitation. Because of the appreciable water solubility of the sulfate, the latter technique is usually resorted to despite the cost of the alcohol. The guanidine molecule being that desired, said guanidine values can also be isolated by forming a less soluble salt, such as a picrate, a carbonate, or a phosphate. The preparation of such less soluble salts is effected by simply adding a sufficient amount of the corresponding acid to the aqueous solution of the sulfate and inducing crystallization by any conventional means such as those aforementioned.

The guanidine values may also be recovered as free guanidine by dissolving the dry sulfates in ethanol, adding an excess of potassium hydroxide to precipitate the sulfate ion as potassium sulfate and thus provide an alcoholic solution of the free base. A small amount of by-product usually obtained in the reaction mixture is insoluble in the alcohol and is thus removed with the potassium sulfate by filtration.

The guanidine sulfates provided by the process of the present invention are valuable chemicals being useful as fire-proofing agents, in the preparation of resins and blueprint materials and as intermediates in the preparation of chemotherapeutic agents, pharmaceuticals, surface active agents, and the like.

While the invention has been described with particular reference to specific embodiments, it is to be understood that it is not to be limited thereto but is to be construed broadly and restricted solely by the scope of the appended claims.

What is claimed is:

1. A process of preparing a guanidine sulfate comprising reacting carbon dioxide, ammonia, and sulfur trioxide at a temperature within the range of substantially 250°–400° C. employing a molecular ratio of substantially 1 mol of $CO_2$:1–2 mols of $SO_3$:2–6 mols of $NH_3$.

2. A process of preparing a guanidine sulfate comprising reacting carbon dioxide, ammonia and sulfur trioxide at a temperature within the range of substantially 250°–400° C. employing a molecular ratio of substantially 1 mol of $CO_2$,1–2 mols of $SO_3$:2–6 mols of $NH_3$ at a total pressure of at least 300 lbs./sq. in.

3. A process of preparing a guanidine sulfate comprising reacting carbon dioxide, ammonia and sulfur trioxide at a temperature within the range of substantially 275°–350° C. employing a molecular ratio of substantially 1 mol of $CO_2$:1–2 mols of $SO_3$:2–6 mols of $NH_3$ at a total pressure of at least 300 lbs./sq. in.

4. A continuous process for preparing a guanidine sulfate comprising passing carbon dioxide, ammonia, and sulfur trioxide in a ratio of substantially 1 mol of $CO_2$:1–2 mols of $SO_3$:2–6 mols of $NH_3$ through a reactor maintained at a temperature within the range of substantially 275°–350° C., cooling said reaction mixture to solidify the guanidine sulfate so produced sufficiently to permit its separation therefrom, separating said sulfate from said reaction mixture, and recirculating said gases.

JOHNSTONE S. MACKAY.

No references cited